(12) United States Patent
Chung et al.

(10) Patent No.: US 11,054,922 B2
(45) Date of Patent: Jul. 6, 2021

(54) USING METHOD OF REWRITABLE BOARD

(71) Applicant: NATIONAL CHENG KUNG UNIVERSITY, Tainan (TW)

(72) Inventors: Chen-Kuei Chung, Tainan (TW); Chung-Yu Yu, Tainan (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 16/666,745

(22) Filed: Oct. 29, 2019

(65) Prior Publication Data
US 2021/0124435 A1 Apr. 29, 2021

(51) Int. Cl.
*B43L 1/10* (2006.01)
*G06F 3/0354* (2013.01)
*B43K 7/00* (2006.01)

(52) U.S. Cl.
CPC .......... *G06F 3/03545* (2013.01); *B43K 7/005* (2013.01)

(58) Field of Classification Search
CPC ........................................................ B43L 1/00
See application file for complete search history.

(56) References Cited

U.S. PATENT DOCUMENTS 7,381,684 B2    6/2008  Tsukida et al.

*Primary Examiner* — Ian A Rummel
(74) *Attorney, Agent, or Firm* — Rosenberg, Klein & Lee

(57) ABSTRACT

The present invention discloses a using method of a rewritable board. It comprises applying or removing a fluid on the rewritable board for writing repeatedly, wherein the rewritable board is an aluminum based material sequentially having a porous aluminum oxide layer and a metal layer thereon, and wherein the porous aluminum oxide layer has a porosity ranging from 10% to 80%.

5 Claims, 3 Drawing Sheets
(1 of 3 Drawing Sheet(s) Filed in Color)

USING METHOD OF REWRITABLE BOARD

BACKGROUND OF THE INVENTION

1. Field of the Invention

The present invention relates to a using method of a rewritable board which can be used for writing words or drawing pictures by applying a fluid to the rewritable board made of an anodized aluminum based material, and removing the words or the pictures for rewriting after the fluid is evaporated or wiped out from the rewritable board.

2. Description of Related Art

Words or pictures are wrote or drew on a bamboo piece, a pottery, a turtle shell or a sheepskin with ink or a carving process for recording before a paper is invented. After the paper is invented, the paper is gradually used for recording words or pictures and plays a very important role until now. Most of the paper is disposable, and an environmental issue caused by paper production and discarding is arisen as a using amount of paper is growing.

In spite of reducing the using amount of paper, a rewriting technology is also developed due to an increased environmental awareness in many countries. The rewriting technology usually utilizes a thermochromic material, a fluorescent material or a special pigment as a rewriting pigment in which the words or the pictures written or draw by the abovementioned materials are revealed or disappeared by changing temperature or light exposure. For instance, the United State patent U.S. Pat. No. 7,381,684 B2, issued on 3 Jun. 2008, discloses a method for using a rewritable thermal label. The rewritable thermal label is a non-contact heat-sensitive rewritable label which comprises an anchor coat layer comprising a crosslinked resin, a heat-sensitive color development layer, a light absorption and photo-thermal conversion layer, and an adhesive layer. The rewritable thermal label records and erases information repeatedly in a non-contact manner.

However, complicated and dangerous chemical materials are usually used to manufacture pigments used in rewriting technology. Although the rewritable board is also provided for use nowadays, contaminant or waste is yielded in accompany with the process of writing and erasing by using the conventional rewritable board, so the rewritable board still causes environmental pollution. Therefore, it is needed to develop an environmental friendly rewriting technology without using special pigments for rewriting.

SUMMARY OF THE INVENTION

The present invention discloses a using method of a rewritable board which can be used for writing words or drawing pictures by applying a common fluid such as water or alcohol on the rewritable board made of an anodized aluminum based material without using a special pigment and for rewriting after the common fluid is evaporated or wiped out and reverted to an unused state.

The method of using a rewritable board comprises applying or removing a fluid on the rewritable board for writing repeatedly, wherein the rewritable board is an aluminum based material sequentially having a porous aluminum oxide layer and a metal layer thereon, and wherein the porous aluminum oxide layer has a porosity ranging from 10% to 80%. In an embodiment of the present invention, the fluid is water, alcohol, glycerol or silicon oil, and the fluid is filled in a writing pen.

In an embodiment of the present invention, the writing pen has a storage space for re-filling the fluid for writing for a long time.

In an embodiment of the present invention, the rewritable board is disposed on a heating plate or attached a heater for removing the fluid.

In an embodiment of the present invention, the metal layer is made by a metal material having a reflectivity larger than 70% and has a thickness ranging from 5 nm to 15 nm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENT

To provide a thorough understanding, the purpose and advantages of the present invention will be described in detail with reference to the accompanying drawings.

Referring to FIG. 1 and FIG. 2(a)-FIG. 2(c), the present invention relates to a method of using a rewritable board by applying or removing a fluid on the rewritable board for writing repeatedly, wherein the rewritable board is an aluminum based material sequentially having a porous aluminum oxide layer and a metal layer thereon, and wherein the porous aluminum oxide layer has a porosity ranging from 10% to 80%. The fluid is water, alcohol, glycerol or silicon oil, and the fluid is filled in a writing pen. The writing pen comprises a storage space for re-filling the fluid for writing for a long time. The rewritable board can be disposed on a heating plate or attached a heater for removing the fluid. The metal layer is made by a metal material having a reflectivity larger than 70% and has a thickness ranging from 5 nm to 15 nm.

Figure 1:
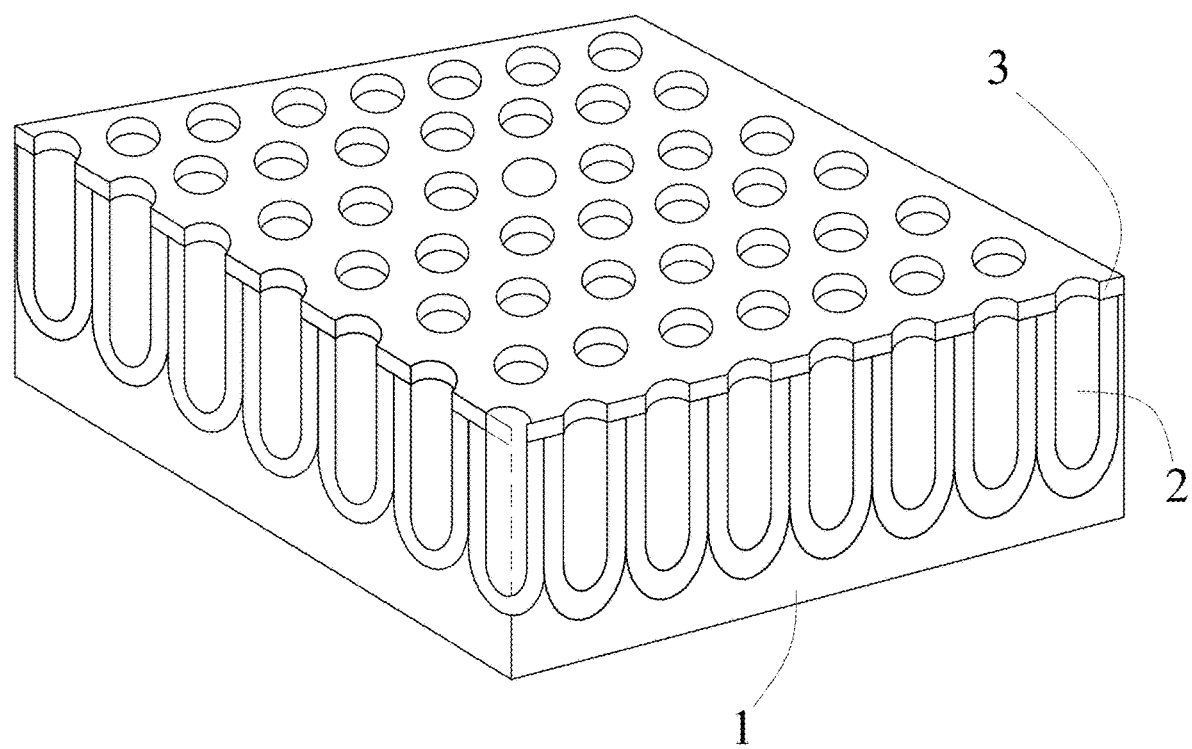
FIG. 1 is a stereogram showing a structure of a rewritable board of the present invention.

Referring to FIG. 1, the rewritable board of the present invention is made of an anodized aluminum based material (1). Two anodizing methods are provided respectively in Embodiment 1 and Embodiment 2 and are described below.

Embodiment 1

An aluminum based material (1), e.g., a pure aluminum material, an aluminum-coated material or an aluminum alloy is used in an anodizing process in Embodiment 1. The anodizing process is conducted by a potentiostat having three electrodes (Jiehan 5000, Taiwan) at 20° C. to 40° C. The potentiostat has an auxiliary electrode made of a platinum net, a working electrode made of an aluminum piece, and a reference electrode made of Ag/AgCl. The aluminum based material (1) is soaked in an electrolyte comprising 0.3 M oxalic acid solution, and the aluminum based material (1) is applied with a pulse voltage for 90 seconds to 300 seconds for anodizing in which the pulsed voltage has a positive voltage ranging from 20 V to 40 V and a negative voltage of −2 V. A cycle time of the positive voltage and the negative voltage is 2 seconds in which the aluminum based material (1) is alternated applied with the positive voltage for 1 second and the negative voltage for 1 second for a period of time. Therefore, a porous aluminum oxide layer (2) comprising plural nano-holes arranged regularly is formed on the aluminum based material (1).

For adjusting a porosity of the porous aluminum oxide layer (2) and a color displayed on the surface of the rewritable board, a hole expanding process is conducted after the anodizing process. However, if the phosphoric acid solution is used as the electrolyte in the anodizing process, the hole expanding process is not needed since a standard-compliant porosity of the porous aluminum oxide layer (2) is obtained in the anodizing process. The preferable porosity of the porous aluminum oxide layer (2) is about 45%. In Embodiment 1, the oxalic acid solution is used for anodizing so the hole expanding process is needed. In the hole expanding process of Embodiment 1, the aluminum based material (1) having the porous aluminum oxide (2) is soaked in an etching solution comprising 1 wt % to 10 wt % phosphoric acid solution for incubation for 1 minute to 60 minutes at 10° C. to 45° C. After the hole expanding process, various interference wavelengths are generated from the aluminum based material (1) and the surface color of the aluminum based material (1) is changed in response to a change of the incubation time.

Then, the above mentioned aluminum based material (1) having the porous aluminum oxide layer (2) is coated with a metal layer (3) having a thickness of 6 nm to 10 nm to obtain the rewritable board of the present invention. In a preferable embodiment, the metal layer (3) is made of a metal material selected from the group consisting of platinum (Pt), aluminum (Al), silver (Ag), gold (Au), iron (Fe), nickel (Ni), cobalt (Co), chromium (Cr), titanium (Ti), tantalum (Tu) and copper (Cu), and the metal material used has a reflectivity larger than 70%. After coating the metal layer (3), a surface color saturation of the rewritable board of the present invention is increased.

Embodiment 2

An aluminum based material (1), e.g., a pure aluminum material, an aluminum-coated material or an aluminum alloy is chosen used in an anodizing process in Embodiment 2. The anodizing process is conducted by an arbitrary waveform generators (WF1944, Taiwan) at 0° C. to 25° C. The arbitrary waveform generators has an auxiliary electrode made of a platinum net and a working electrode made of an aluminum piece. The aluminum based material (1) is soaked in an electrolyte comprising 0.3 M oxalic acid solution and the aluminum based material (1) is applied with a D.C. voltage for 45 seconds to 300 seconds for anodizing in which the D.C. voltage is a positive voltage ranging from 20 V to 40 V. Therefore, a porous aluminum oxide layer (2) comprising plural nano-holes arranged regularly is formed on the aluminum based material (1).

For adjusting a porosity of the porous aluminum oxide layer (2) and a color displayed on the surface of the rewritable board, a hole expanding process is conducted after the anodizing process. However, if the phosphoric acid solution is used as the electrolyte in the anodizing process, the hole expanding process is not needed since a standard-compliant porosity of the porous aluminum oxide layer (2) is obtained in the anodizing process. The preferable porosity of the porous aluminum oxide layer (2) is about 45%. In Embodiment 2, the oxalic acid solution is used for anodizing so the hole expanding process is needed. In the hole expanding process of Embodiment 2, the aluminum based material (1) having the porous aluminum oxide (2) is soaked in an etching solution comprising 1 wt % to 10 wt % phosphoric acid solution for incubation for 1 minute to 60 minutes at 10° C. to 45° C. After the hole expanding process, various interference wavelengths are generated from the aluminum based material (1) and the surface color of the aluminum based material (1) is changed in response to a change of the incubation time.

Then, the abovementioned aluminum based material (1) having the porous aluminum oxide layer (2) is coated with a metal layer (3) having a thickness of 6 nm to 10 nm to obtain the rewritable board of the present invention. Preferably, the metal layer (3) is made of a metal material selected from the group consisting of platinum (Pt), aluminum (Al), silver (Ag), gold (Au), iron (Fe), nickel (Ni), cobalt (Co), chromium (Cr), titanium (Ti), tantalum (Tu) and copper (Cu), and the metal material used has a reflectivity larger than 70%. After coating the metal layer (3), a surface color saturation of the rewritable board of the present invention is increased.

Figure 2A:
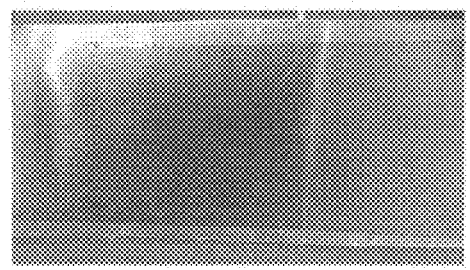
FIG. 2(a)-FIG. 2(c) are real samples showing a writing process and an erasing process of the present invention.
Figure 2B:
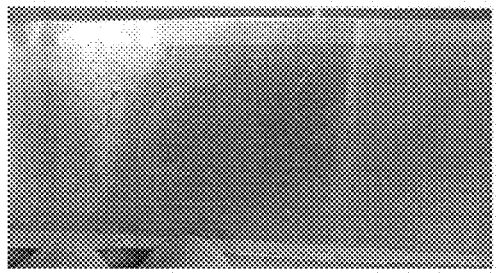

Referring to FIG. 2(a), it is a real rewritable board for writing words or drawing pictures, and the fluid for writing or drawing can be filled in a writing pen such as a water brush. In FIG. 2(b), a word "NCKUME" is performed immediately after the fluid is applied to the surface of the rewritable board, and this writing process is a physical reaction. The fluid is mainly selected from a volatile fluid or an easy-to-wipe fluid such as water, alcohol, glycerol of silicon oil. The colors performed of the words or the pictures on the rewritable board are different when writing or drawing by different fluids, and the surface color of the rewritable board also affects the colored performed of the fluids thereon.

In addition, the metal layer (3) of the rewritable board can enhance color performance on the rewritable board due to interference of partial wavelengths of the visible light.

Figure 2C:
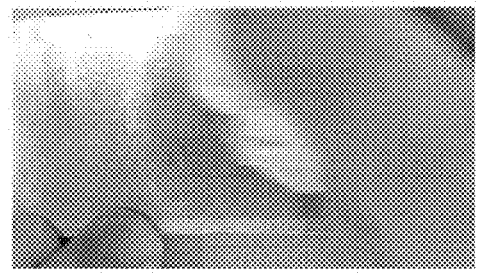
Figure 3:
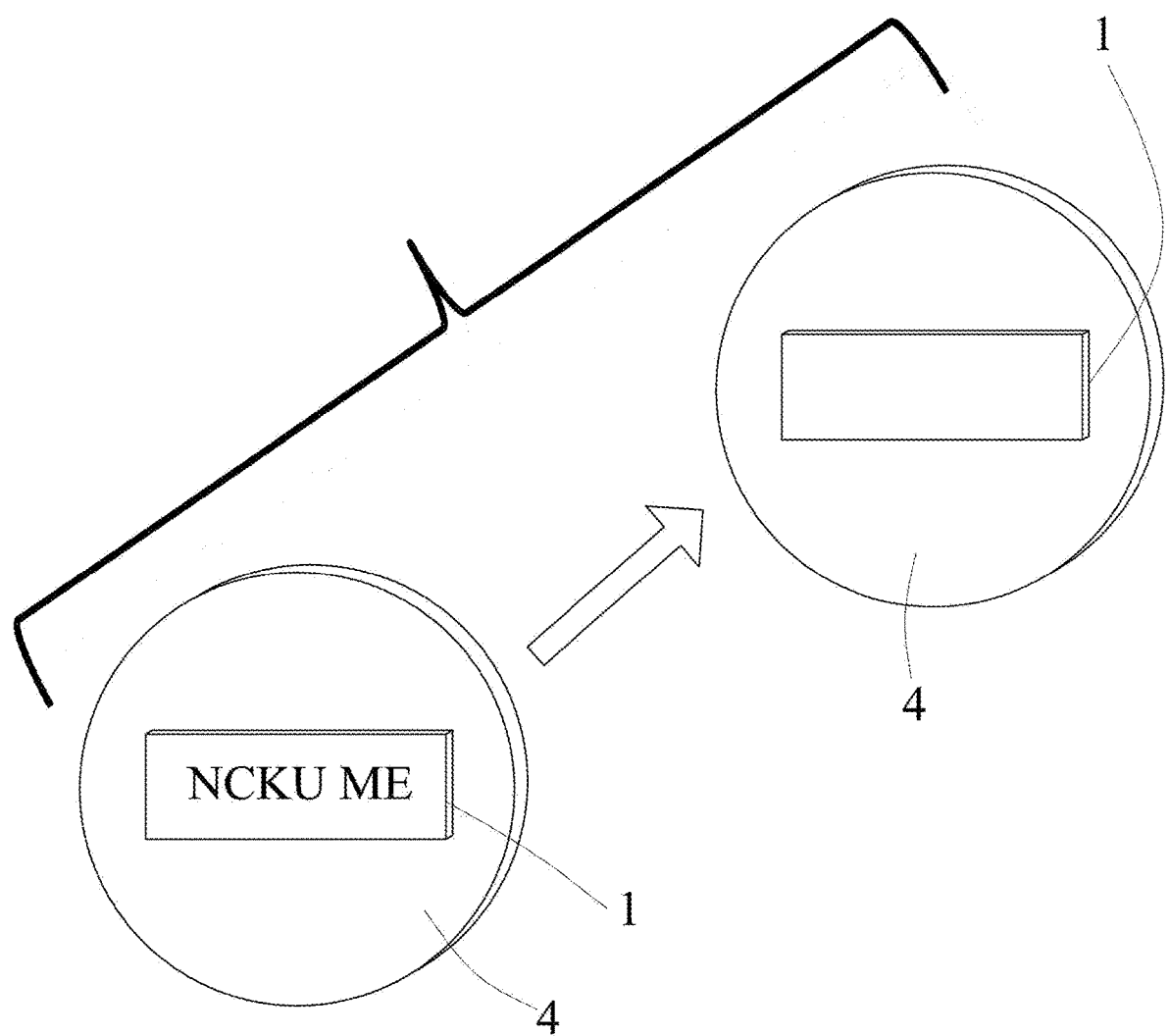
FIG. 3 is a schematic diagram showing a fluid removed from the rewritable board by a heating plate of the present invention.

After the fluid on the rewritable board is evaporated, the words or pictures on are disappeared gradually and the rewritable board is reverted to an unused state and a user can rewrite on the rewritable board by the fluid. In addition, the rewritable board can be disposed on a heating plate (4) by the side not coated with the metal layer (3) of the aluminum based material (1). As shown in FIG. 3, an evaporation rate of the fluid is accelerated by heating to clear the words or pictures on the rewritable board quickly. In addition, the fluid is also removed from the rewritable board by wiping out directly or mediated by a cleaning solution as shown in FIG. 2(c) to revert the rewritable board to an unused state in FIG. 2(a). Therefore, a user can write on the rewritable board once again with the fluid.

According to the description above, the present invention has advantages compared to the conventional technology:

1. The present invention relates to a using method of a rewritable board and the rewritable board is manufactured by anodizing an aluminum based material, and a user can write words or draw pictures on the rewritable board directly by using a common fluid.

2. The words or the pictures on the rewritable board of the present invention is erased by removing the fluids on the rewritable board and a user can write on the rewritable board by the fluid once again; the present invention does not contaminate the environment since no wastes or pollutions are generated when the fluid is removed.

3. The conventional rewritable board utilizes chemical reactions for writing or erasing words or pictures thereon by using special pigments. However, the words or the pictures are displayed on the rewritable board of the present invention by a physical reaction which is more efficient for writing or erasing word or pictures on the rewritable board.

What is claimed is:

1. A method of using a rewritable board, comprising applying or removing a fluid on the rewritable board for writing repeatedly, wherein the rewritable board is an aluminum based material sequentially having a porous aluminum oxide layer and a metal layer thereon, and wherein the porous aluminum oxide layer has a porosity ranging from 10% to 80%.

2. The method as claimed in claim 1, wherein the fluid is water, alcohol, glycerol or silicon oil and filled in a writing pen.

3. The method as claimed in claim 2, wherein the writing pen has a storage space for re-filling the fluid for writing.

4. The method as claimed in claim 1, wherein the rewritable board is disposed on a heating plate or attached a heater for removing the fluid.

5. The method as claimed in claim 1, wherein the metal layer is made by a metal material having a reflectivity larger than 70% and has a thickness ranging from 5 nm to 15 nm.

* * * * *